(12) United States Patent
Bledsoe et al.

(10) Patent No.: US 6,997,409 B1
(45) Date of Patent: Feb. 14, 2006

(54) AUTOMATIC SPEED ADJUSTING FISHING REEL

(76) Inventors: Steven W. Bledsoe, 2169 Via Teca, San Clemente, CA (US) 92673; Richard S. Duncan, 30 Pheasant La., Aliso Viejo, CA (US) 92656

( * ) Notice: Subject to any disclaimer, the term of this patent is extended or adjusted under 35 U.S.C. 154(b) by 0 days.

(21) Appl. No.: 10/894,882

(22) Filed: Jul. 19, 2004

(51) Int. Cl.
  *A01K 89/01* (2006.01)
(52) U.S. Cl. .................................. 242/257; 192/107 R
(58) Field of Classification Search ............... 242/257, 242/259, 261–264, 266, 255, 271; 192/89.21, 192/93 R, 107 R, 108
See application file for complete search history.

(56) References Cited

U.S. PATENT DOCUMENTS

| | | | | |
|---|---|---|---|---|
| 3,675,502 A | * | 7/1972 | Sarah ........................... 74/369 |
| 4,193,763 A | * | 3/1980 | Cipolli et al. ................... 8/532 |
| 4,427,162 A | * | 1/1984 | Noda .......................... 242/241 |
| 4,560,118 A | * | 12/1985 | Weber et al. ................ 242/255 |
| 4,564,158 A | * | 1/1986 | Moosberg et al. ........... 242/261 |
| 4,850,550 A | * | 7/1989 | Aoki ........................... 242/261 |
| 5,058,447 A | * | 10/1991 | Ikuta ............................ 74/371 |
| 5,161,750 A | * | 11/1992 | Hitomi ........................ 242/295 |
| 5,205,511 A | * | 4/1993 | Morimoto .................... 242/261 |
| 5,454,526 A | * | 10/1995 | Kaneko ....................... 242/255 |
| 5,513,814 A | * | 5/1996 | Zanon ......................... 242/241 |
| 6,102,316 A | * | 8/2000 | Nilsen ......................... 242/255 |
| 6,254,020 B1 | * | 7/2001 | Nilsen ......................... 242/255 |
| 6,325,315 B1 | * | 12/2001 | Chang ......................... 242/255 |
| 6,505,787 B1 | * | 1/2003 | Nilsen ......................... 242/255 |
| 6,672,526 B1 | | 1/2004 | Bledsoe et al. |

* cited by examiner

*Primary Examiner*—Emmanuel Marcelo
(74) *Attorney, Agent, or Firm*—Jack C. Munro

(57) ABSTRACT

An automatic rewinding two-speed fishing reel that utilizes a transmission which includes a post assembly mounted on a driver that is rotatable on a shaft that connects to a recess arrangement formed in a low gear that is also rotatable on the shaft. The post assembly is engaged with the recess arrangement when in the low speed mode and is displaced from the recess arrangement when in the high speed mode. Connecting wall surfaces between the post assembly and the recess arrangement form an angle other than ninety degrees and preferably between ten and sixty degrees relative to the longitudinal center axis of the shaft.

6 Claims, 4 Drawing Sheets

AUTOMATIC SPEED ADJUSTING FISHING REEL

BACKGROUND OF THE INVENTION

1. Field of the Invention

The field of this invention relates to a fishing reel and more particular to a fishing reel which will automatically adjust between a slow rewind speed and a fast rewind speed depending on the resistance that is encountered with the fishing line.

2. Description of the Related Art

The present invention is deemed to be an improvement over the structure defined within U.S. Pat. No. 6,672,526, issued Jan. 6, 2004, entitled, AUTOMATIC TWO-SPEED TRANSMISSION FOR A FISHING REEL, which includes the present inventor as one of the inventors.

In the past there have been constructed numerous different types of variable speed fishing reels. Most such reels require a manual selection to change speeds. While fishing with a rod and reel, there are occasions when a fishing reel with a fast retrieve ratio is very desirable such as when retrieving a lure while trolling, recovering an empty hook when one has lost his bait or attempting to keep the fishing line taut between the rod tip and a hooked fish that is swimming towards the angler. However, when an angler is attempting to subdue a large powerful fish that is pulling against the rod and reel, the leverage disadvantage of a reel with a high gear ratio can restrict the anglers ability to retrieve line and capture the fish. An angler with a manual shift variable speed reel can choose the proper gear ratio to suit the moment. However, the disadvantage of a manual shift reel is that the angler must stop turning the reel handle and stop applying pressure to a hooked fish in order to manually shift gears in the reel. This act can result in the loss of the fish. In order to avoid the loss of the fish due to slack line or pausing from applying pressure to the fish, it is desirable to construct a fishing reel that will automatically make the selection from high speed to low speed not requiring any manual selection by the angler.

However, within the fishing reel of the aforementioned patent when the fishing reel is being driven at low speed by turning of the reel handle, there is quite a bit of pressure that is applied to the transmission that is incorporated in conjunction within the reel. This pressure may cause the transmission to slip. This slipping of the transmission at an inopportune time can cause the fishing line to break resulting in a loss of the fish that is hooked.

SUMMARY OF THE INVENTION

A first embodiment of automatic two-speed transmission for a fishing reel which utilizes a driver and a low gear that are located directly adjacent each other and are mounted on a shaft which has a longitudinal center axis. The driver and the low gear are connectable by an engagement mechanism which comprises a post and a cavity where the post is capable of being disconnected from the cavity or the post is to be locatable within the cavity. With the post being disconnected from the cavity, relative movement between the driver and the low gear is possible. With the post mounted within the cavity, the driver and the low gear are driven together. The post has a first wall surface that abuts against a second wall surface of the cavity that produces the driving connection between the driver and the low gear. Both the first wall surface and the second wall surface are located at an angle within the range of one degree to sixty degrees relative to the longitudinal center axis.

A further embodiment of the present invention is where the first basic embodiment is modified by the angle being defined as being precisely ten degrees.

A further embodiment of the present invention is where the first basic embodiment is modified by there being defined a plurality of posts which are evenly spaced apart and there are also a plurality of cavities with a single cavity to connect with a single post.

A further embodiment of the present invention is where the first basic embodiment is modified by the post being defined as being continuously spring biased toward an engagement with a cavity.

A further embodiment of the present invention is where the first basic embodiment is modified by the post being defined as including a cam surface with the cavity being defined as including a camming surface. The cam surface is to ride up the camming surface during movement of the driver to disconnect such from the low gear.

A second main embodiment of the present invention is directed to a fishing reel which automatically adjusts to a low rewind speed or a high rewind speed. The fishing reel includes a transmission assembly which includes a pair of members located in juxtaposition. This pair of members are mounted on a shaft which has a longitudinal center axis. The transmission assembly includes a post and a cavity. When the post engages with the cavity, the pair of members are driven together and when the post is spaced from the cavity, the pair of members are not being driven together. The post has a first wall surface that abuts a second wall surface of the cavity that produces a driving connection between the pair of members. The first wall surface and the second wall surface are located at an angle which is not parallel to the longitudinal center axis.

A further embodiment of the present invention is where the second basic embodiment is modified by the angle being defined as being within the range of one degree to sixty degrees.

A further embodiment of the present invention is where the second basic embodiment is modified by there being utilized a plurality of posts which are evenly spaced apart with there being a plurality of corresponding cavities with a single cavity to connect with a single said post.

A further embodiment of the present invention is where the second basic embodiment is modified by the post being defined as being spring biased toward engagement with the cavity.

A further embodiment of the present invention is where the second basic embodiment is modified by the post including a cam surface with the cavity including a camming surface. The cam surface is to ride up the camming surface during movement to separate the members.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
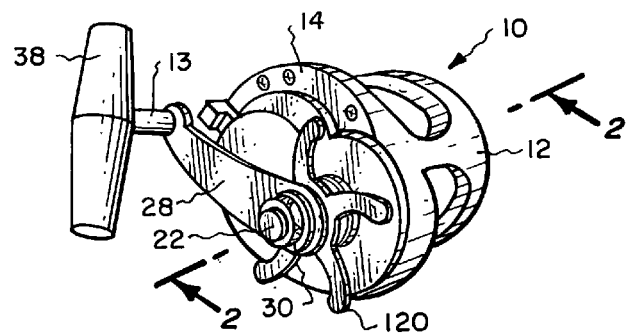
FIG. 1 is a perspective view of a lever drag fishing reel which incorporates the automatic two-speed transmission in accordance with the present invention.
Figure 2:
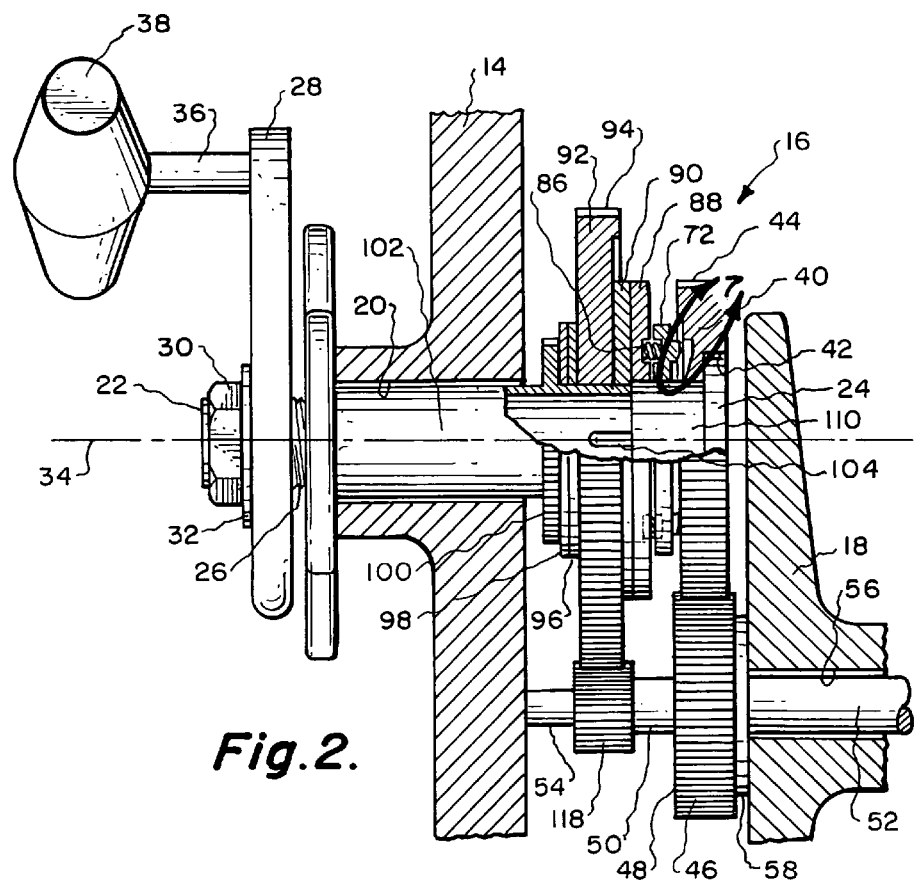
FIG. 2 is a fragmentary cross-sectional view taken along line 2—2 of FIG. 1 showing the automatic two-speed transmission in the position of high rewind speed.
Figure 3:
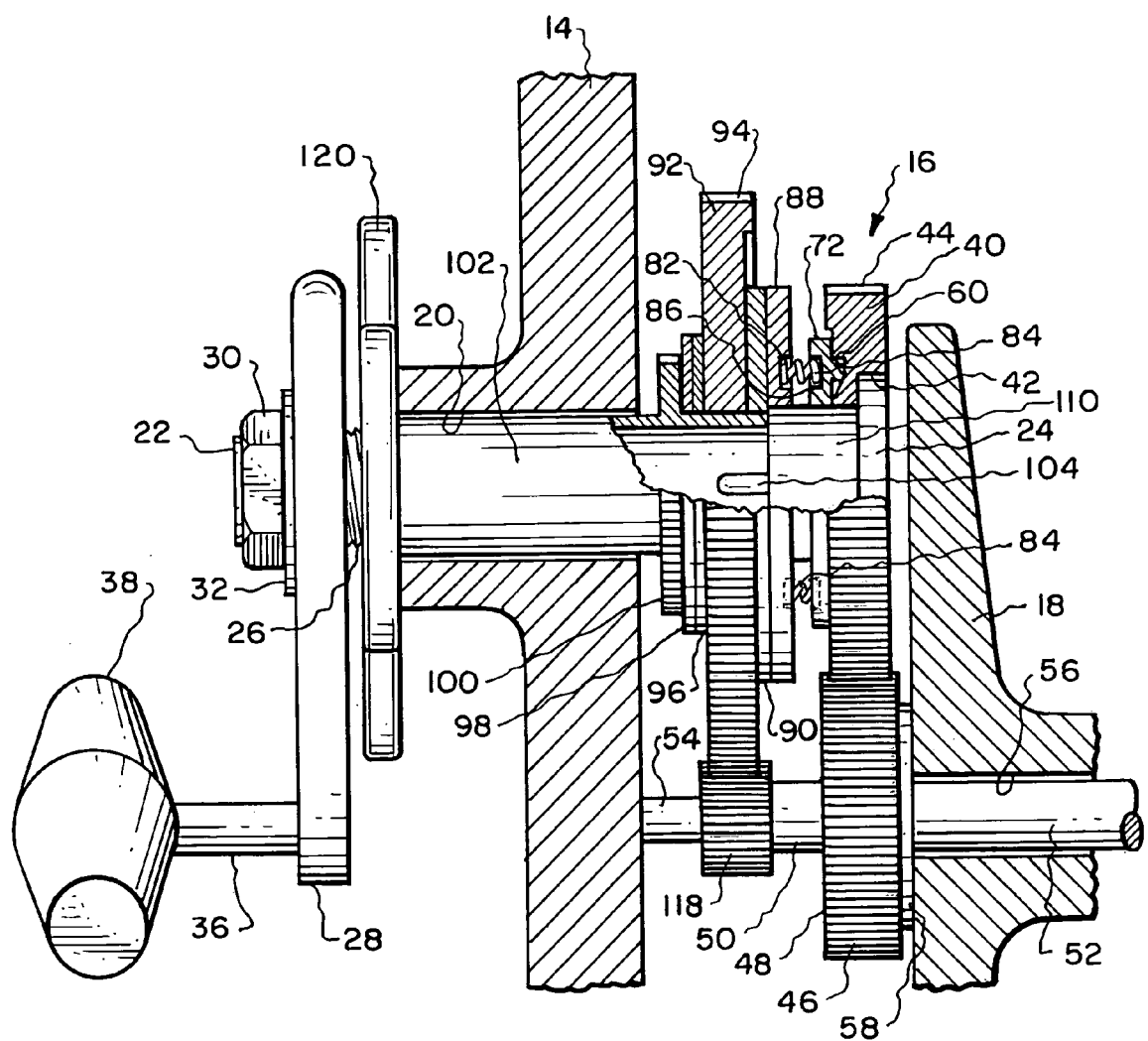
FIG. 3 is view similar to FIG. 2 but showing the transmission in the position of low rewind speed.
Figure 4:
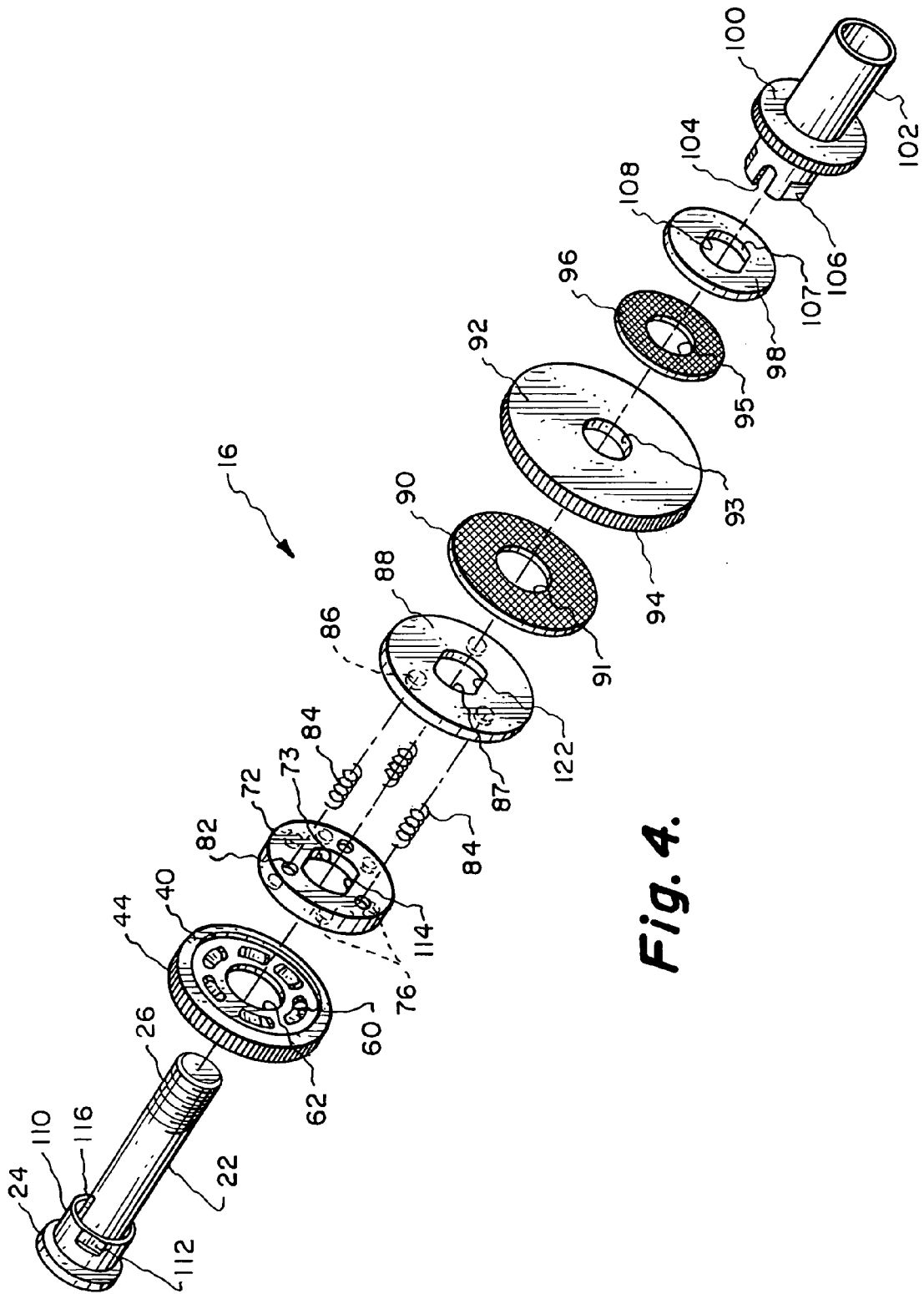
FIG. 4 is an exploded perspective view of the internal components of the fishing reel of the present invention.
Figure 5:
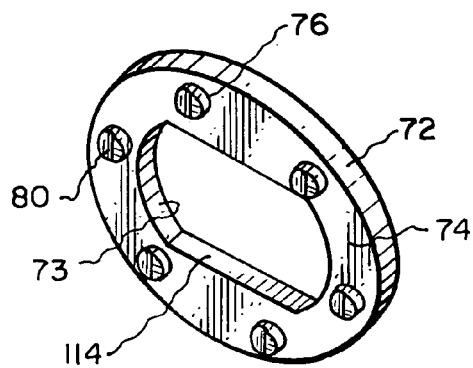
FIG. 5 is a perspective view of the low gear driver included within the fishing reel of the present invention showing in detail the configuration of the posts that are utilized on the low gear driver.
Figure 6:
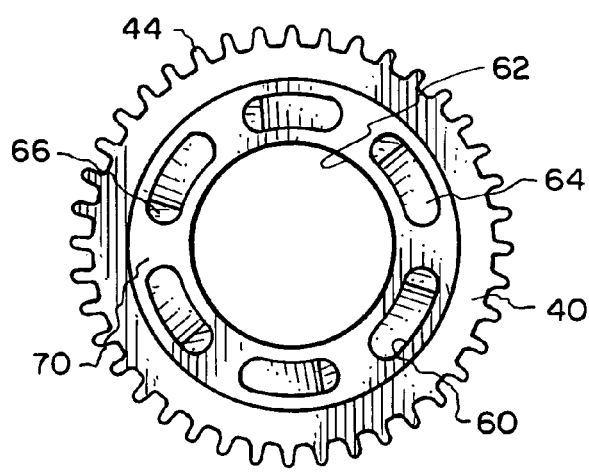
FIG. 6 is a side view of the low gear that is utilized in conjunction with the fishing reel transmission of the present invention showing the arrangement of the cavities that are to engage with the posts located on the member of FIG. 5.

FIG. 1 is an exterior view of the fishing reel constructed in accordance with the present invention. The fishing reel shown in FIG. 1 is what is termed a lever drag fishing reel. However, the present invention could be utilized in conjunction with star drag fishing reels. The present invention is directed to the including of an automatic two-speed transmission within the reel which does not require shifting by the operator to change from a high speed gear ratio to a low speed gear ratio and vice versa. The transmission will automatically shift into a high speed gear ratio, which is shown in FIG. 2, when tension on the fishing line is low, such as when trolling or reeling in of a lure or bait through the water. The transmission will automatically shift to a low speed gear ratio, the configuration which is shown in FIG. 3, when the fishing line tension exceeds a predetermined setting.

Low speed gear ratios are desired when tension on the fishing line is high so that high mechanical advantage is provided to the user, such as when fighting against a fish attempting to reel in the fish or when reeling in a large fish that is heavy in weight. Automatic shifting from low gear back to high gear is important to prevent slack from developing in the fishing line so the fish turn and run toward the angler. Automatic shifting as opposed to manual gear shifting is additionally important if an angler is holding the fishing rod with one hand and turning the fishing reel crank with the other hand while fighting a large fish.

Referring particularly to FIG. 1 there is shown an exterior view of the fishing reel 10 of this invention. The fishing reel 10 includes a reel frame 12 which is mounted to a side plate 14. Mounted within the reel frame 12 is a transmission 16 which is utilized to drive a spool 18. Fishing line is to be wound on the spool 18.

The side plate 14 has a through hole 20. Extending through the through hole 20 is a drive shaft 22. The inner end of the drive shaft 22 is formed into an enlarged annular flange 24. The outer end of the drive shaft 22 includes a series of external threads 26. Threadably secured on threads 26 is a crank handle lever 28. The crank handle lever 28 is fixedly secured onto the drive shaft 22 by means of a conventional nut 30. Located between the nut 30 and the crank handle lever 28 is a washer 32. The drive shaft 22 has a longitudinal center axis 34. Fixedly attached to the crank handle lever 28 and located parallel to but displaced from the longitudinal center axis 34 is an arm 36. Fixedly mounted on the outer end of the arm 36 is a handle 38. Manual grasping of the handle 38 and rotating of such causes the crank handle lever 28 to rotate which in turn will cause rotation of the drive shaft 22.

The transmission 16 has a low speed gear 40 mounted and held against the flange 24. The gear 40 includes a center opening 42 within which is located the flange 24. The external periphery of the gear 40 includes an annular series of gear teeth 44. The gear teeth 44 are in continuous engagement with gear teeth 46 of a low speed pinion gear 48. The pinion gear 48 is integral with the sleeve 50. The sleeve 50 has a through passage (which is not shown) through which is conducted a spool shaft 52. The inner end of 54 of the spool shaft 52 is rotatably journaled to the inner surface of the side plate 14. The outer end of the spool shaft 52 is conducted through through passage 56 of the spool 18. Fixedly mounted onto the pinion gear 48 and located directly against the spool 18 is a clutch plate 58.

The inner side surface of the gear 40 includes a series of recesses 60 which is part of an engagement mechanism. The recesses 60 are elongated and arcuate and are evenly spaced apart. There is shown to be six in number of the recesses 60. However, the number of the recesses 60 could be increased or decreased without departing from the scope of this invention. The recesses 60 are located annularly disposed about center through opening 62 within which is located the inner end of the drive shaft 22 and the flange 24.

Figure 7:
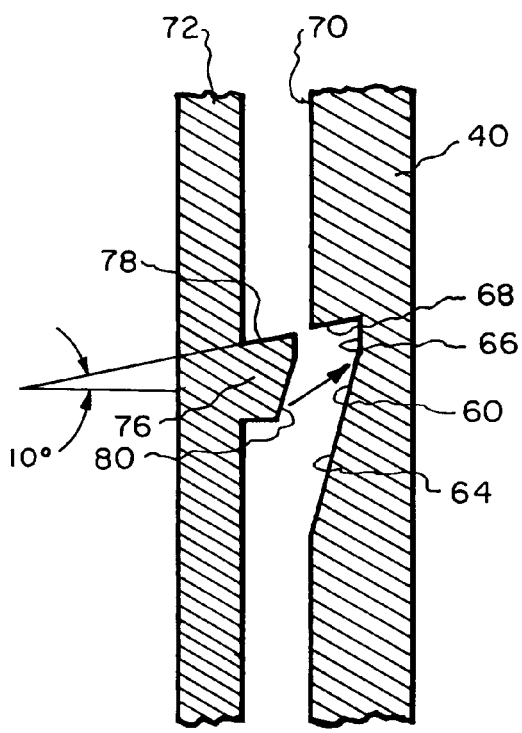
FIG. 7 is an enlarged cross-sectional view of a single post and cavity connected between the driver member and the low gear member showing the angular relationship of the forward wall of the post and a front wall of the cavity to be ten degrees.
Figure 8:
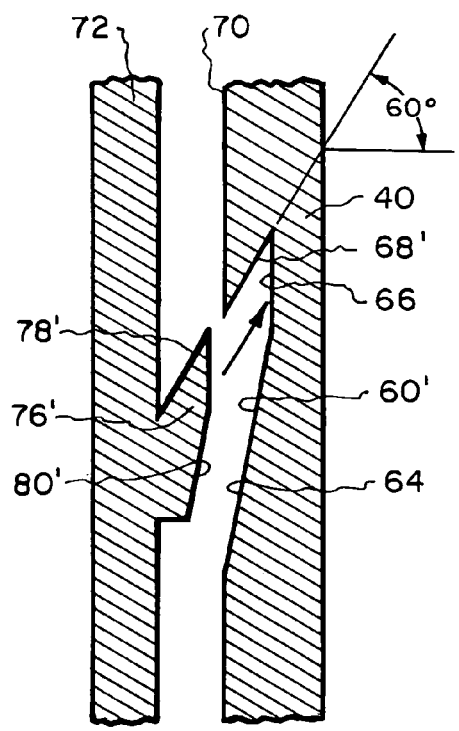
FIG. 8 is a cross-sectional view similar to FIG. 7 but showing the angular relationship of the forward wall of the post and the front wall of the cavity to be sixty degrees.

Each of the recesses 60, which are also part of the engagement mechanism, include a camming surface in the form of an inclined surface 64 which could also be called a ramp. At the end of each recess 60 the inclined surface 64 connects to deep section 66. The deep section 66 is closed by a forward wall 68, which is shown in FIG. 7. In FIG. 8, the forward wall is defined as 68'. In FIG. 7, the forward wall is defined as being inclined one degree or greater relative to the longitudinal center axis 34 with ten degrees being preferred. In FIG. 8, the forward wall 68' forms a sixty degree angle relative to the longitudinal center axis 34. The reason for the different angles of the forward surfaces 68 and 68' will be explained further on in the specification.

Located directly adjacent to the side surface 70 of the gear 40 is a low speed gear driver 72. Mounted on the outer surface 74 of the low speed driver 72 are a plurality of evenly spaced apart posts 76. Driver 72 has a central through opening 73. There are six in number of the posts 76. Therefore, there is a single post 76 that is capable of connecting with a single recess 60. The post 76 includes a front wall 78 which is inclined at an angle which is equal to the angle of the forward wall 68. Noting FIG. 7, it can be seen that the angle of ten degrees relative to the longitudinal center axis 34, is established for the front wall 78. In FIG. 8, the front wall 68' of the post 76' is located at sixty degrees relative to the longitudinal center axis 34. The top of each post 76 includes a cam surface in the form of an inclined surface 80. The top of each post 76' includes a cam surface in the form of an inclined surface 80'. The operation of the posts 76 and 76' relative to the recesses 68 and 68' will be explained further on in the specification.

Formed within the back surface of the driver 72 are three in number of spaced apart recesses 82. Mounted within each recess 82 is a coil spring 84. The three coil springs 84 could be replaced by a single cone spring which surrounds through opening 73. The opposite end of the coil spring 84 fits within a recess 86 of a backing plate 88. Backing plate 88 also has a centrally located through opening 87. The opposite surface of the backing plate 88 abuts against a clutch plate 90. The clutch plate 90 is to be formed of a non-metallic material which is commonly used in conjunction with braking shoes. Clutch plate 90 abuts against one side of a high speed gear 92 with its center through opening 91 aligning with through opening 87. High speed gear 94 has mounted thereon its periphery a series of gear teeth 94. Placed against the opposite side of the gear 92 is a clutch plate 96 which is similar in construction to clutch plate 90 except clutch plate 96 is smaller in size. Clutch plate 96 has a center through opening 95 which is to align with through opening 93 of gear 92. Abutting against clutch plate 96 is a backing plate 98. The backing plate 98 abuts against an antireverse gear 100. The antireverse gear 100 is integrally mounted on a drive sleeve 102. The drive sleeve 102 has a pair of slots 104 (only one in number of the slots 104 being shown) and a pair of flats 106, again with only one in number of the flats 106 being shown. The flats 106 connect with flats 108 of the backing plate 98 which are formed in conjunction with through opening 107 of backing plate 98. This means that the backing plate 98 is non-rotatably secured relative to the drive sleeve 102. In a similar manner, the flange 104 has a drive shaft hub 110 connected thereto and extending therefrom. The hub 110 has mounted thereon a pair of flats 112, again with only one in number of the flats 112 being shown with it being understood that there is another flat 112 on an opposite side of the hub 110. These flats 112 are to operatively engage with flats 114 formed in conjunction with through opening 73 of the driver 72. This means that the driver 72 is non-rotatably secured relative to the drive shaft 22.

Each of the slots 104 engages with a ridge 116 which is formed on the drive shaft 22. As a result, the drive sleeve 102 is rotatably secured to the drive shaft 22. The gear teeth 94 of the gear 92 mesh with a pinion gear 118. Pinion 20 gear 118 is integral with the sleeve 50 and is rotationally mounted on the inner end 54 of the spool shaft 52. The clutch plate 58 is to be constructed of a similar material as has been constructed for clutch plate 90 and clutch plate 96.

Mounted on the threads 26 is a tension preset wheel 120. The tension preset wheel 120 is to be manually turned by the angler which will cause drive shaft 22 to be moved relative to the side plate 14. This will result in a frictional force to be applied through each of the clutch plates 90 and 96 to the gear 92. The amount of force that is applied to the gear 94 can be varied by either tightening of the wheel 120 or loosening of the wheel 120.

The antireverse gear 100 connects with a pair of cogs, which are not shown, which are mounted on the inside wall of the side plate 14. These cogs ratchet and permit the antireverse gear 100 to only rotate in one direction. These cogs are not shown in the drawings. However, the function of the antireverse gear 100 is deemed to be conventional and forms no specific part of this invention. The flats 122 formed in conjunction with through opening 87 on the backing plate 88 engage with the flats 112 on the drive shaft hub 110. This means that the backing plate 99 is non-rotatably secured relative to the drive shaft 22. The drive shaft 22 extends through each of the openings 62, 73, 87, 91, 93, 95 and 107.

The operation of the fishing reel 10 of this invention is as follows: Under conditions of no resistance on the fishing line, the clutch plates 90 and 96 apply a frictional force to the high speed gear 92 with the amount of this frictional force being determined by tightening or loosening of the wheel 120. Rotation of the drive shaft 22 causes the high speed gear 92 to rotate. This causes the pinion gear 118 to rotate which rotates the spool 80 in a forward direction to reel in the fishing line which is to be wound on the spool 80. The speed of rotation of the spool 80 is deemed to be a high rate of speed at low resistance. The rotational force of pinion gear 118 is transmitted through the sleeve 50 and pinion gear 48 and through the clutch plate 58 which frictionally engages with the spool 18. This type of rotational movement of the spool 18 is what occurs in what is called a lever drag fishing reel. Referring particularly to FIG. 2 where the force transmission is through the high speed gear 92, the low speed pinion gear 48 causes the low speed gear 40 to rotate at a speed greater than that of the drive shaft 22 and the driver 72 does not engage the low speed gear 40. The posts 76 are attempting to be located within the recesses 60 due to the continuous bias of the coil springs 84. However, because the gear 40 is rotating faster in a counterclockwise direction relative to the driver 72, the inclined surfaces 80 ride up the inclined surfaces 64 which causes the driver 72 to be moved longitudinally compressing the coil springs 84 and locating of the posts 76 in a disconnected position from each of their respective recesses 60.

When resistance is applied to the fishing line at a force greater than the clutch frictional resistance exerted on the high speed gear 92 by the clutch plates 90 and 96, such as when reeling in a large fish, the gear 92 slips, losing its ability to drive the spool 18. As the high speed gear 92 slips, the rotation of the pinion gears 48 and 118 slow allowing the drive shaft 22 and the driver 72 to match the rotational speed of the gear 40. When the rotational speed of the driver 72 matches or exceeds the rotational speed of the gear 40, the bias of the springs 84 forces the driver 72 toward the gear 40 so that each post 76 will rest within a recess 60 with each front wall 78 abutting against its respective forward wall 68. The drive force then to the spool 18 is achieved from gear 40 through pinion gear 48 providing the user with a high mechanical advantage at the crank handle lever 28.

There is a tendency that if the force is great enough for the posts 76 to be forced out of engagement with the recesses 60. It is for this reason that the front wall 78 is inclined and the forward wall 68 is similarly inclined with this inclination being at such an angle to tend to maintain the engagement of the posts 76 with respect to each of the recesses 80. It has been found that the most preferable angle is the ten degree angle shown in FIG. 7 for each front wall 78 and each forward wall 68 relative to the longitudinal center axis 34. However, in FIG. 8, this angle could be decreased from ten degrees to the sixty degree angle for the front wall 78' and the forward wall 68' within each of the recesses 60'. Actually, any angle could be utilized between the ten degree angle of FIG. 7 and the sixty degree angle of FIG. 8. It is considered to be within the scope of this invention that actually any angle away from parallel to the longitudinal center axis could be used, such as one, two, three, four, five, and so forth. However, the ten degree angle seems to be the most desirable to ensure that accidental disengagement of the driver 72 relative to the gear 40 will not occur.

When the transmission 16 is in low gear, that is the driving force occurring through the pinion 48, and if the resistance is suddenly reduced, such as when a fish moves toward the angler causing the fishing line to slacken, the frictional resistance of the plates 90 and 96 against the high speed gear 92 becomes greater than the resistance applied to the fishing line and applied to the spool 18. The result is the high speed gear 92 resumes driving the pinion gear 118 thereby allowing the user to reel in the fishing line on the spool 18 at a high rate of speed.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. In an automatic two-speed transmission for a fishing reel comprising a driver and a low speed gear that are located directly adjacent each other, said driver and said low speed gear being mounted on a shaft that has a longitudinal center axis, said driver and said low speed gear being connectable by an engagement mechanism, said engagement mechanism comprising a post and a cavity where said post is to be capable of being disconnected from said cavity or said post is to be located within said cavity, with said post disconnected from said cavity relative movement between said driver and said low speed gear is possible, with said post mounted within said cavity said driver and said low speed gear are to be driven together, the improvement comprising:

said post having a forward wall that abuts against a front wall of said cavity that produces a driving connection between said driver and said low speed gear, both said forward wall and said front wall being located at an angle within the range of one to sixty degrees relative to said longitudinal center axis.

2. The automatic two-speed transmission for a fishing reel as defined in claim 1 wherein:

said angle being ten degrees.

3. The automatic two-speed transmission for a fishing reel as defined in claim 1 wherein:

instead of a single said post there being a plurality of posts which are located in an evenly spaced apart arrangement, instead of a single said cavity there being a plurality of cavities with a single said cavity to connect with a single said post.

4. The automatic two-speed transmission for a fishing reel as defined in claim 1 wherein:

said post being continuously spring biased toward engagement with said cavity.

5. The automatic two-speed transmission for a fishing reel as defined in claim 1 wherein:

said post including a cam surface, said cavity including a camming surface, said cam surface to ride up said camming surface during movement of said driver to disconnect from said low speed gear.

6. A fishing reel which automatically adjusts to either a low rewind speed or a high rewind speed comprising:

a transmission assembly which includes a pair of members located in juxtaposition, said pair of members being mounted on a shaft which has a longitudinal center axis, said transmission assembly including a post and a cavity, with said post engaging with said cavity said pair of members being driven together, with said post being spaced from said cavity said pair of members not being driven together, said post having a forward wall that abuts a front wall of said cavity that produces a driving connection between said pair of members, said forward wall and said front wall being located at an angle relative to said longitudinal center axis which is not parallel to said longitudinal center axis; and said angle being in the range of ten degrees to sixty degrees.

* * * * *